(12) United States Patent
Chacko et al.

(10) Patent No.: US 7,730,185 B2
(45) Date of Patent: Jun. 1, 2010

(54) METHOD, APPARATUS AND COMPUTER PROGRAM PRODUCT FOR SHARING RESOURCES

(75) Inventors: Joseph Chacko, Winchester (GB); Gordon Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/469,080

(22) Filed: Aug. 31, 2006

(65) Prior Publication Data

US 2007/0053381 A1    Mar. 8, 2007

(30) Foreign Application Priority Data

Sep. 3, 2005    (GB)    ................... 0518013.8

(51) Int. Cl.
*G06F 15/173*    (2006.01)
(52) U.S. Cl. ..................... 709/226; 370/468; 370/395.4
(58) Field of Classification Search ................ 370/468, 370/395.2, 395.4; 395/650; 364/230.3, 281.3, 364/281.6, 262.1; 709/203, 217, 226
See application file for complete search history.

(56) References Cited

U.S. PATENT DOCUMENTS

| | | | | |
|---|---|---|---|---|
| 4,542,458 A | * | 9/1985 | Kitajima et al. | 718/104 |
| 4,625,081 A | * | 11/1986 | Lotito et al. | 379/88.26 |
| 5,325,525 A | * | 6/1994 | Shan et al. | 718/104 |
| 5,457,793 A | * | 10/1995 | Elko et al. | 707/205 |
| 5,535,256 A | * | 7/1996 | Maloney et al. | 379/309 |
| 5,566,349 A | * | 10/1996 | Trout | 710/20 |
| 5,640,595 A | * | 6/1997 | Baugher et al. | 710/10 |
| 5,819,043 A | * | 10/1998 | Baugher et al. | 709/222 |
| 5,968,115 A | * | 10/1999 | Trout | 718/107 |
| 2005/0182825 A1 | * | 8/2005 | Eytchison | 709/217 |

* cited by examiner

*Primary Examiner*—Jason E Mattis
*Assistant Examiner*—Kibrom T Hailu
(74) *Attorney, Agent, or Firm*—David A. Mims, Jr.

(57) ABSTRACT

In a computer system including a set of resources for allocation to, and access by, a plurality of consumers, a method for allocating a resource to a requesting consumer comprising: calculating a suitability rating for each resource in the set of resources as a value in a range from least suitable to most suitable, the suitability rating being calculated from: a) a measure of recency of access to the resource; b) a measure of a number of times the resource has been accessed by a consumer other than the requesting consumer since a previous access to the resource by the requesting consumer; and c) a measure of a number of times the resource is accessed by a different consumer since the previous access to the resource by the requesting consumer; identifying a resource having a suitability rating which is closest to most suitable; and allocating the identified resource to the requesting consumer.

13 Claims, 7 Drawing Sheets

METHOD, APPARATUS AND COMPUTER PROGRAM PRODUCT FOR SHARING RESOURCES

FIELD OF THE INVENTION

The present invention relates to sharing resources between multiple resource consumers. In particular it relates to reducing a likelihood of contention for shared resources.

BACKGROUND OF THE INVENTION

Resources can be shared between multiple resource consumers, and consumers can request to access a type of resource as required. Examples of types of resource include: communications sockets in a network; storage such as memory or disk; and processor time. Examples of types of consumer include: software threads; application processes; and computer systems. In use, consumers who have a need for a type of resource request access to the type of resource, and a resource of the appropriate type is allocated to the consumer in satisfaction of the request. Once allocated, a resource can be accessed by the consumer as required. Future requirements for access to the same type of resource can arise, and the same or a different resource can be allocated accordingly. Sharing resources between consumers is complex because it is necessary to ensure that, on the one hand, consumers have ready access to a resource when required, and on the other hand, that resources are not contended between a large number of requesting consumers. Contention for a resource arises when two or more consumers attempt to access a resource simultaneously. Such simultaneous access needs to be regulated and techniques for managing contention, such as resource locking and synchronisation, are well known in the art and do not form part of this discussion except insofar as they are resource intensive. For this reason, contention between consumers of a resource is preferably avoided. It is therefore desirable to share a resources in such a way that reduces the likelihood of contention.

One way to manage the sharing of a resource between multiple consumers is to provide exclusive access to a resource for a consumer. This involves a consumer requesting to access a resource, and the consumer being granted exclusive access to the resource until the consumer indicates that it is finished accessing the resource. Only once the consumer is finished accessing the resource will it be made available to another consumer. This approach is effective where the use of a resource by a consumer is determinate, that is, the use of the resource is explicitly terminated when the consumer is finished accessing the resource. In some cases, however, the use of a resource is not determinate because a consumer is not able to indicate when it is finished accessing the resource. In these cases, it is not possible to provide exclusivity over a resource for a consumer since use of the resource can be ongoing for a consumer. Consequently the potential for contention arises.

The likelihood of contention can be reduced by providing multiple resources of a required type of resource. In an extreme, one resource can be provided per requesting consumer with no need to share resources. However, this approach is ineffective where the number of available resources is limited and/or the number of consumers is unknown. Where there is a larger number of consumers than the maximum number of resources there will always be a possibility of contention. In such situations it is desirable to allocate resources to consumers in such a way that contention between the consumers is reduced. It would therefore be advantageous to provide for the sharing of a limited number of resources between multiple consumers in a way which reduces the possibility of contention.

SUMMARY OF THE INVENTION

In a first aspect, the present invention accordingly provides, in a computer system including a set of resources for allocation to, and access by, a plurality of consumers, a method for allocating a resource to a requesting consumer comprising: calculating a suitability rating for each resource in the set of resources as a value in a range from least suitable to most suitable, the suitability rating being calculated from: a) a measure of recency of access to the resource; b) a measure of a number of times the resource has been accessed by a consumer other than the requesting consumer since a previous access to the resource by the requesting consumer; and c) a measure of a number of times the resource is accessed by a different consumer since the previous access to the resource by the requesting consumer; identifying a resource having a suitability rating which is closest to most suitable; and allocating the identified resource to the requesting consumer.

Preferably the recency of allocation of a particular resource is measured by comparing the current total number of accesses to all resources in the set of resources to a value of a total number of accesses to all resources recorded at a time the particular resource was previously allocated.

Preferably the recency of allocation of a particular resource is calculated by subtracting the value of the total number of accesses to all resources recorded at the time the particular resource was previously accessed from the total number of accesses to all resources in the set of resources.

Preferably the method further comprises in response to a determination that the suitability rating closest to most suitable does not exceed a suitability threshold, generating a new resource and allocating the new resource to the requesting consumer.

In a second aspect, the present invention accordingly provides, in a computer system including a set of resources for allocation to, and access by, a plurality of consumers, a system for allocating a resource to a requesting consumer comprising: means for calculating a suitability rating for each resource in the set of resources as a value in a range from least suitable to most suitable, the suitability rating being calculated from: a) a measure of recency of access to the resource; b) a measure of a number of times the resource has been accessed by a consumer other than the requesting consumer since a previous access to the resource by the requesting consumer; and c) a measure of a number of times the resource is accessed by a different consumer since the previous access to the resource by the requesting consumer; means for identifying a resource having a suitability rating which is closest to most suitable; and means for allocating the identified resource to the requesting consumer.

In a third aspect, the present invention accordingly provides a computer program product comprising computer program code which, when executed on a data processing system, instructs the data processing system to carry out the method as described above.

In a fourth aspect, the present invention accordingly provides a data processing system comprising: a central processing unit; a memory subsystem; an input/output subsystem; and a bus subsystem for interconnecting the central processing unit, the memory subsystem, the input/output subsystem; and a system as described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
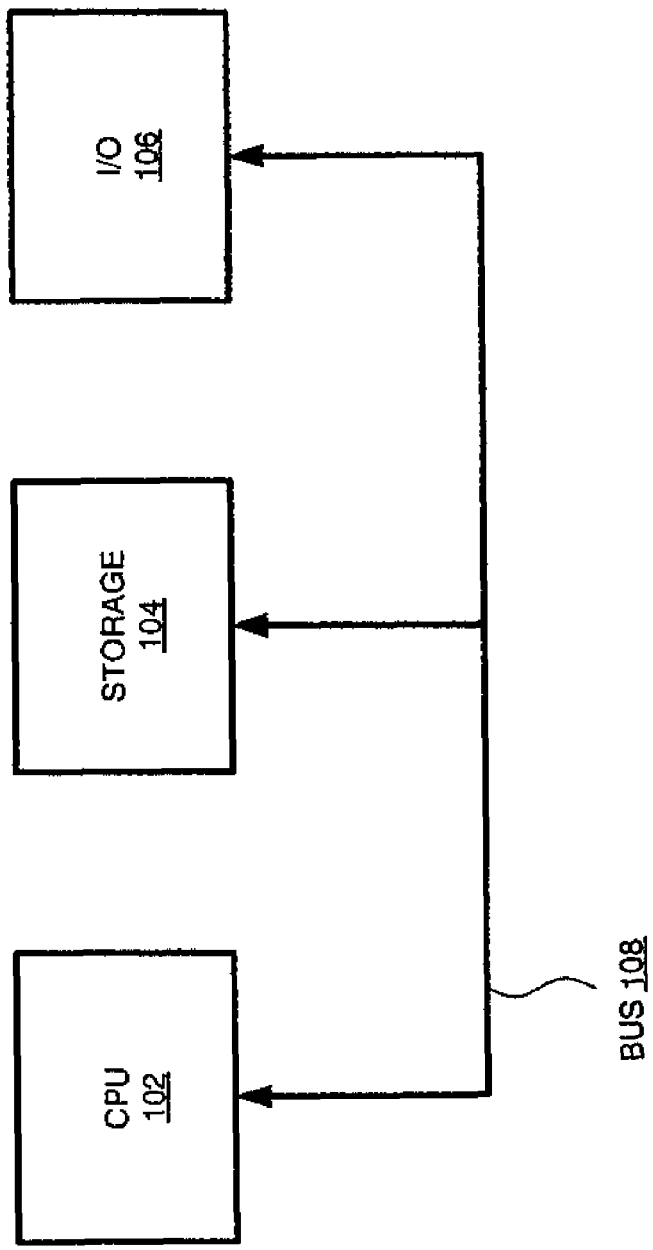
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
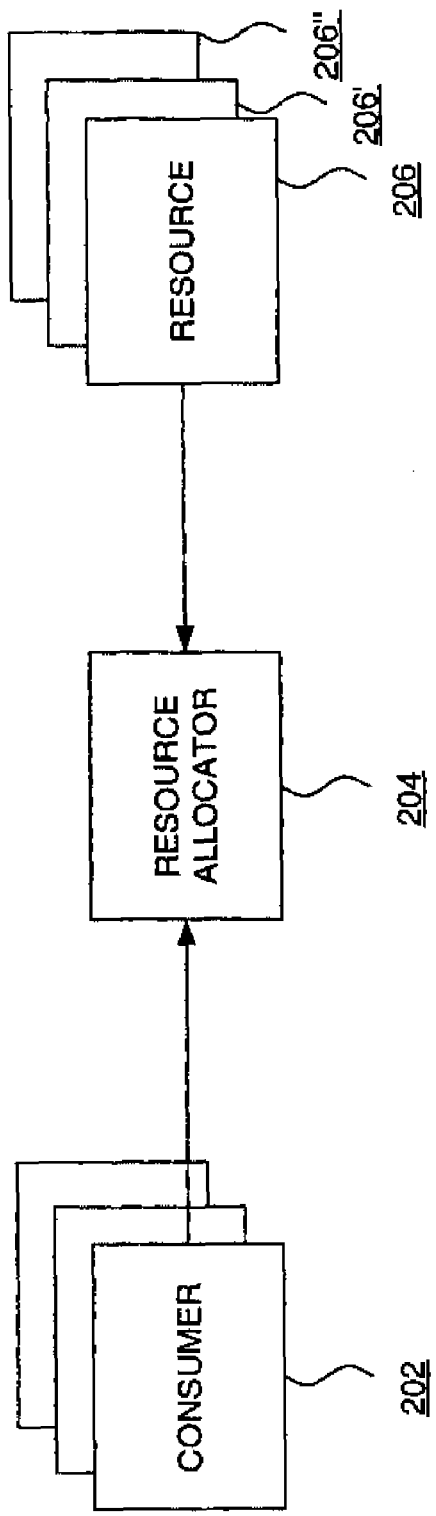
FIG. 2 is a schematic illustration of a system in accordance with a preferred embodiment of the present invention.

FIG. 2 is a schematic illustration of a system in which a consumer 202 requests the allocation of a resource 206 via a resource allocator 204 in accordance with a preferred embodiment of the present invention. Consumers are software or hardware entities which utilise resource. For example, consumer 202 can be: a software thread; an application process; a computer system; a handheld device; a terminal; a terminal emulator; an application component; or logical software entity. Consumer 202 is one of a plurality of consumers which can each exist as physically or logically separate entities, such as separate threads or separate computer systems. Consumer 202 is communicatively connected to the resource allocator 204, which is a software or hardware entity for receiving requests from consumer 202 and allocating resources 206 to consumer 202 in satisfaction of such requests. For example, the resource allocator 204 is a software application executing on a computer system, and is in communication with consumers 202 via a wired or wireless computer network. Whilst the resource allocator 204 can be implemented so as to be physically or logically separate to the consumer 202, the resource allocator 204 can equally be a software or hardware entity which resides with the consumer 202, such as a software process running on a computer system including the consumer 202. Resources 206, 206' and 206" are consumable entities conforming to a particular resource type. Examples of types of resource include: network resources such as communications sockets; storage such as memory or disk; processors or processor time; bandwidth on a communications medium; and output devices such as displays and printers. Resources 206, 206' and 206" are accessible to, and consumable by, consumer 202. For example, resource 206 can be a network socket on a computer system accessible to consumer 202.

In use, the resource allocator 204 receives a request for a resource of a particular type from consumer 202. The resource allocator 204 determines which of the resources 206, 206' and 206" to allocate to the requesting consumer 202 in order to reduce the likelihood of contention for resources. This is achieved by the resource allocator calculating a suitability rating of each of the resources 206, 206' and 206" for the requesting consumer 202. The suitability rating is preferably a numerical value lying along a range of values from a least suitable value to a most suitable value. For example, a range of suitability values might lie from zero to infinity, which values having a higher magnitude corresponding to higher levels of suitability. In this regard, the suitability rating is a score of the relative suitability of resources 206, 206' and 206" which can be used to determine a most suitable resource to allocate to a requesting consumer 202 in order to reduce the likelihood of contention between multiple consumers for the same resource. For example, a particular resource may have been previously allocated to the requesting consumer in satisfaction of a previous need to access a resource. In such a situation, it may be beneficial or desirable to favour the previously allocated resource for a present allocation request. Particular methods for determining suitability ratings are provided in detail below.

Figure 3:
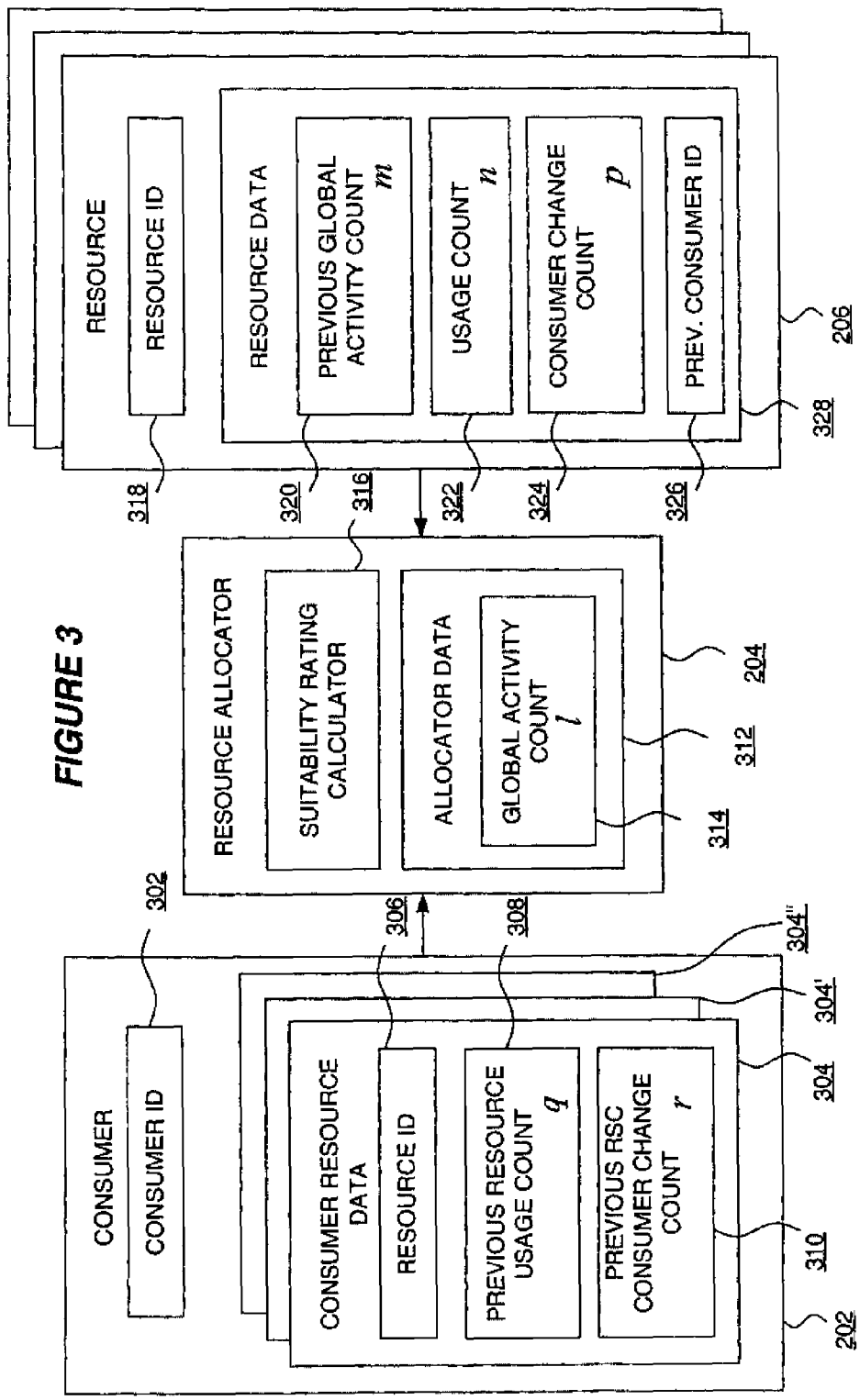
FIG. 3 is a schematic illustration of a system in accordance with a preferred embodiment of the present invention.

FIG. 3 is a schematic illustration of the system of FIG. 2 providing further details of the consumer 202, resource allocator 204 and resource 206 in accordance with a preferred embodiment of the present invention. The consumer 202 includes a unique consumer identifier 302 which is accessible to a resource which has been allocated to the consumer 202 by the resource allocator 204. For example, the consumer identifier 302 may be stored in an area of shared memory accessible to both the consumer 202 and an allocated resource, or alternatively the consumer 202 can actively send a copy of the value of the consumer identifier 302 to an allocated resource. Consumer 202 further includes a set of consumer resource data items 304, 304' and 304". Each of the consumer resource data items 304, 304' and 304" corresponds to a particular resource which is currently being, or has previously been, accessed by the consumer 202 (i.e. Has been allocated to, and accessed by the consumer 202). For example, consumer resource data item 210 can correspond to resource 206. An identifier of a resource is stored in each of the consumer resource data items 304, 304' and 304" as resource identifier 306. Also included in each consumer resource data item 304, 304', 304" is a previous resource usage count q 308 and a previous resource consumer change count r 310. These counts store values which are described in detail below. The consumer resource data 304 is accessible to the resource allocator 204. For example, the consumer resource data 304 can be stored in a memory accessible to the resource allocator 204.

The resource 206 includes a unique resource identifier 318 which is accessible to a consumer to which the resource 206 is allocated by the resource allocator 204. For example, the resource identifier 318 may be stored in an area of shared memory accessible to both the consumer 202 and the resource 206. Resource 206 further includes resource data 328 comprising a previous global activity count m 320, a usage count n 322, a consumer change count p 324 and a previous consumer identifier 326. These counts store values which are described in detail below. The previous consumer identifier 326 is a value of a consumer identifier 302 for a consumer 202 which was last allocated the resource 206. The resource data 328 is accessible to the resource allocator 204. For example, the resource data 328 can be stored in a memory accessible to the resource allocator 204.

The resource allocator 204 includes a suitability rating calculator 326 which is a software or hardware entity for calculating a suitability rating for each of a set of resources available in a system, as are described in detail below. The resource allocator 204 further includes allocator data 312 comprising a global activity count l 314. The global activity count l 314 is a numerical count of a number of times any of a set of resources have been accessed by any consumer. The global activity count l 314 is thus incremented whenever a consumer accesses a resource, as is clear from the method of FIG. 5 which is described in detail below.

Whilst FIG. 3 illustrates the consumer resource data 304 stored within the consumer 202, it will be apparent to those skilled in the art that the consumer resource data 304 could alternatively be stored externally to the consumer 202, such as in the allocator data 312 of the resource allocator 204 or at a different, third party, entity. Similarly, whilst the resource data 328 is illustrated as being stored within the resource 206, it will be apparent to those skilled in the art that the resource data 328 could alternatively be stored externally to the resource 206, such as in the allocator data 312 of the resource allocator 204 or at a different, third party, entity. Furthermore, whilst the allocator data 312 is illustrated as being stored in the resource allocator 204, it will be apparent to those skilled in the art that the allocator data 312 could be stored externally to the resource allocator 204, such as at a third party entity.

Considering now the various counts stored in the consumer resource data 304 and the resource data 328. The previous global activity count m 320 is a numerical value corresponding to a value of the global activity count l 314 when the resource 206 was last allocated to a consumer. The value of m can be used to provide a relative measure of the recency of access of the resource 206 by comparing a value of m at a point in time to a value of l. If a value of l is significantly higher than a value of m for resource 206 it can be concluded that there have been a significant number of accesses of resources in the system since resource 206 was itself last accessed. On the other hand, if a value of l is very close to a value of m for resource 206, it can be concluded that resource 206 has been accessed relatively recently.

The usage count n 322 is a numerical counter of a number of times the resource 206 has been accessed. When resource 206 is accessed, a value of n is incremented.

The consumer change count p 324 is a numerical counter of a number of times resource 206 is accessed by a consumer 202, and the consumer 202 does not have the same consumer identifier 302 as the previous consumer identifier 326 for the resource 206. The value of p provides an indication of the number of consumers accessing the resource 206. A large number of consumers accessing resource 206 corresponds to relatively large likelihood of contention for the resource 206 since different consumers may wish to access the resource 206 at the same time. On the other hand, a small number of consumers accessing the resource 206 corresponds to a relatively small number likelihood of contention for the resource 206. Ideally a number of available resources would permit a one-to-one mapping of resources to consumers, so avoiding all contention between consumers. However, this is not possible where the number of consumers is greater than the number of resources. In this regard, a low value of p is preferable as this represents convergence on the ideal.

Turning now to the counts stored for the consumer 202, each consumer resource data item 304, 304' and 304" includes data for a particular resource having a corresponding resource identifier 306. Consumer resource data 304 is stored for resources currently and previously allocated to the consumer 202, and is updated (by way of the method of FIG. 5) when the consumer 202 accesses each resource. Values of the data items for a resource relate to the previous (most recent) access to that resource by the consumer 202. For each resource, a previous resource usage count q 308 is stored as a copy of a value of the usage count n 322 of the resource. Further, a previous resource consumer change count r 310 is stored as a copy of a value of the consumer change count p 324 of the resource.

In use, in response to a request for a resource received from the requesting consumer 202 by the resource allocator 204, the suitability rating calculator 316 calculates a suitability rating for each resource. The resource allocator 204 then allocates a most suitable resource to the requesting consumer 202. The suitability rating is derived from three measures: a measure of recency of access of the resource 206 (s); a measure of a number of times that the resource 206 has been accessed by consumers other than the requesting consumer 202 since a previous access of the resource to the requesting consumer 202 (t); a measure of a number of times the resource is accessed by a different consumer since the previous access to the resource by the requesting consumer (u). Values of s, t, and u can be calculated from the consumer resource data 304, the allocator data 312 and the resource data 328, as is described below with reference to FIG. 4.

Figure 4:
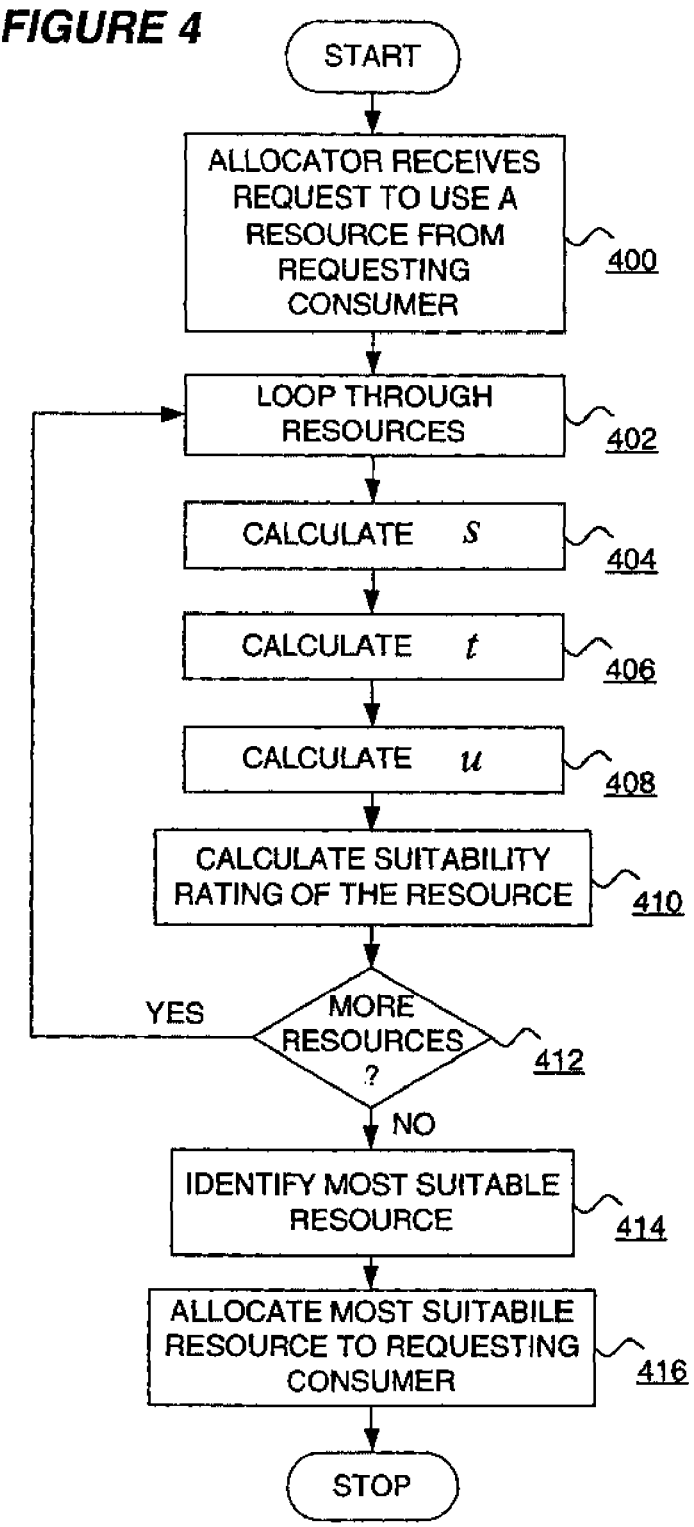
FIG. 4 is a flowchart of a method of a resource allocator in accordance with a preferred embodiment of the present invention.

FIG. 4 is a flowchart of a method of the resource allocator 204 for allocating a resource 206 to a requesting consumer 202 in accordance with a preferred embodiment of the present invention. At step 400, the resource allocator 204 receives a request to be allocated a resource from a requesting consumer 202. At step 402 the method initiates a loop through each of the resources 206, 206' and 206" in the system, the loop including the steps 404 to 410 for each resource. At step 404 for a current resource, a value of the measure of recency of access of the resource (s) is calculated. This is calculated by subtracting the previous global activity count m 320 for the current resource from the global activity count l 314. Thus:

$$s = l - m$$

At step 406 for the current resource, a value of a measure of a number of times that the resource 206 has been accessed by consumers other than the requesting consumer 202 since a previous access of the resource to the requesting consumer 202 (t) is calculated. This can be calculated by subtracting the previous resource usage count q 308 for the current resource in the consumer resource data 304 of the requesting consumer 202 from the usage count n 322 of the current resource. Thus:

$$t = n - q$$

Subsequently, at step 408 for the current resource, a value of a measure of a number of times the resource is accessed by a different consumer since the previous access to the resource by the requesting consumer (u) is calculated. This can be calculated by subtracting the previous resource consumer change count r 310 for the current resource in the consumer resource data 304 of the requesting consumer 202 from the consumer change count p 324 of the current resource. Thus:

$$u = p - r$$

At step 410, the suitability rating calculator 316 calculates a suitability rating for the current resource based on the values of s, t, and u as calculated above. In the preferred embodiment of the present invention the suitability rating is calculated as:

$$\text{suitability} = s + (s/t) + (s/u)$$

It will be apparent to those skilled in the art that the suitability rating could be calculated differently, placing different emphases on the parameters to the calculation (s, t and u) in accordance with a particular requirement of application of the suitability rating.

Subsequently, at step 412 the method determines if there are more resources to process and, if so, loops back to step 402. On completion of the loop, the method proceeds to step 414 where the resource allocator 204 identifies a most suitable resource. In the preferred embodiment the most suitable resource is that resource with the highest value of suitability. At step 416, the identified most suitable resource is allocated to the requesting consumer 202.

Figure 5:
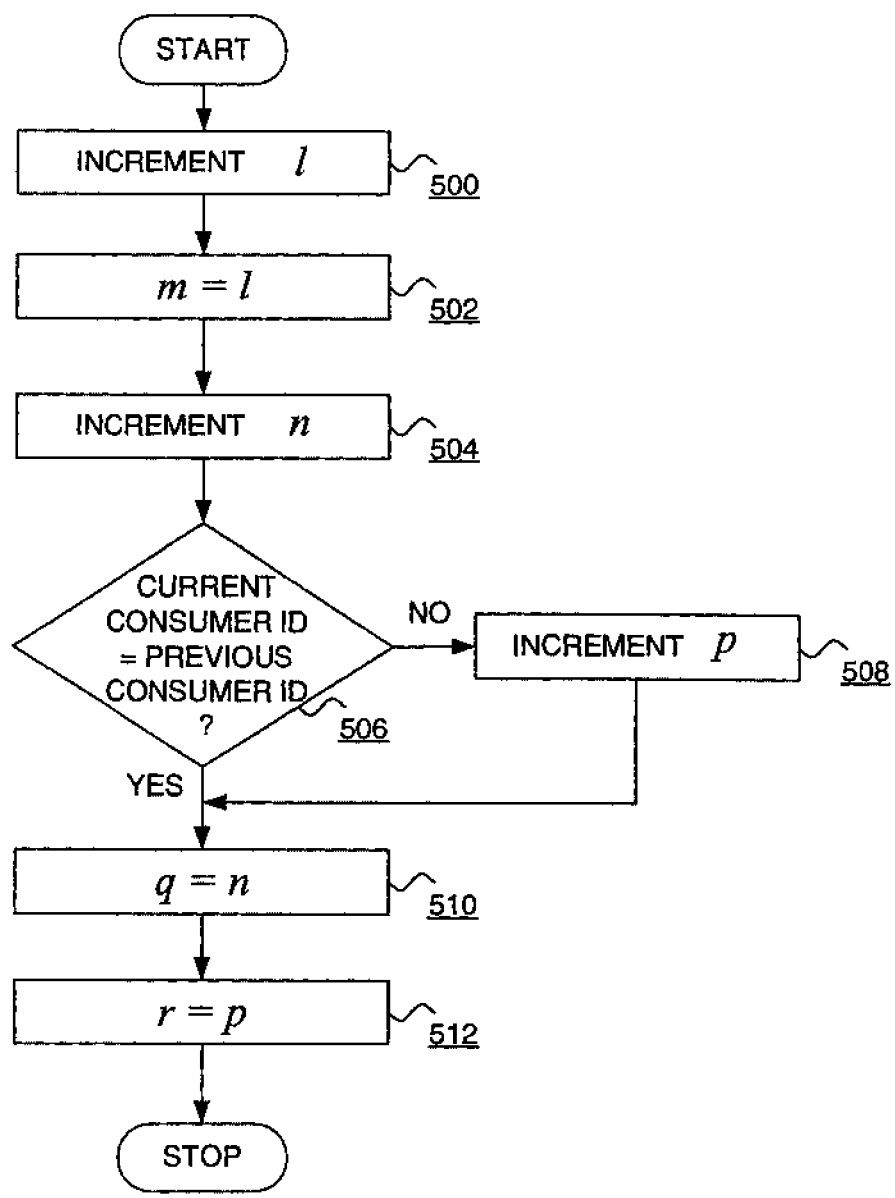
FIG. 5 is a flowchart of a method for updating resource data in accordance with a preferred embodiment of the present invention.

FIG. 5 is a flowchart of a method for updating the resource data 328, the consumer resource data 304 and the allocator data 312 for an allocated resource 206 in accordance with a preferred embodiment of the present invention. When a resource 206 is accessed by a consumer 202, this data must be updated to reflect the new state of the resource. Initially, at step 500, a value of the global activity count l 314 is incremented to reflect a newly accessed resource. At step 502 the value of the global activity count l 314 is assigned to the previous global activity count m 320 for the allocated resource 206. At step 504 a value of the usage count n 322 for the allocated resource 206 is incremented to reflect a new allocation of the resource 206. At step 506 the method determines if a value of a consumer identifier 302 associated with the requesting consumer 202 is the same as a value of the previous consumer identifier 326 for the allocated resource 206. If the value of a consumer identifier 302 is not the same as a value of the previous consumer identifier 326, then there has been a change in the consumer accessing the resource 206. To reflect this change, a value of the consumer change count p 324 is incremented at step 508. Subsequently, at step 510, the method assigns a value of the usage count n 322 to the previous resource usage count q 308 for the requesting consumer 202. Finally, at step 512, a value of the consumer change count p 324 is assigned to the previous resource consumer change count r 310. In this way, the resource data 328, the consumer resource data 304 and the allocator data 312 are updated to reflect a new allocation of an allocated resource 206.

Thus, using the methods of FIGS. 4 and 5, the resource allocator 204 is able to determine a most suitable resource from a set of resources for allocating to a requesting consumer by the calculation of a quantifiable suitability rating. Since the suitability rating is derived from three quantifiable measures (s, t, and u) it is possible to draw a direct comparison between the suitability ratings of different resources.

Figure 6:
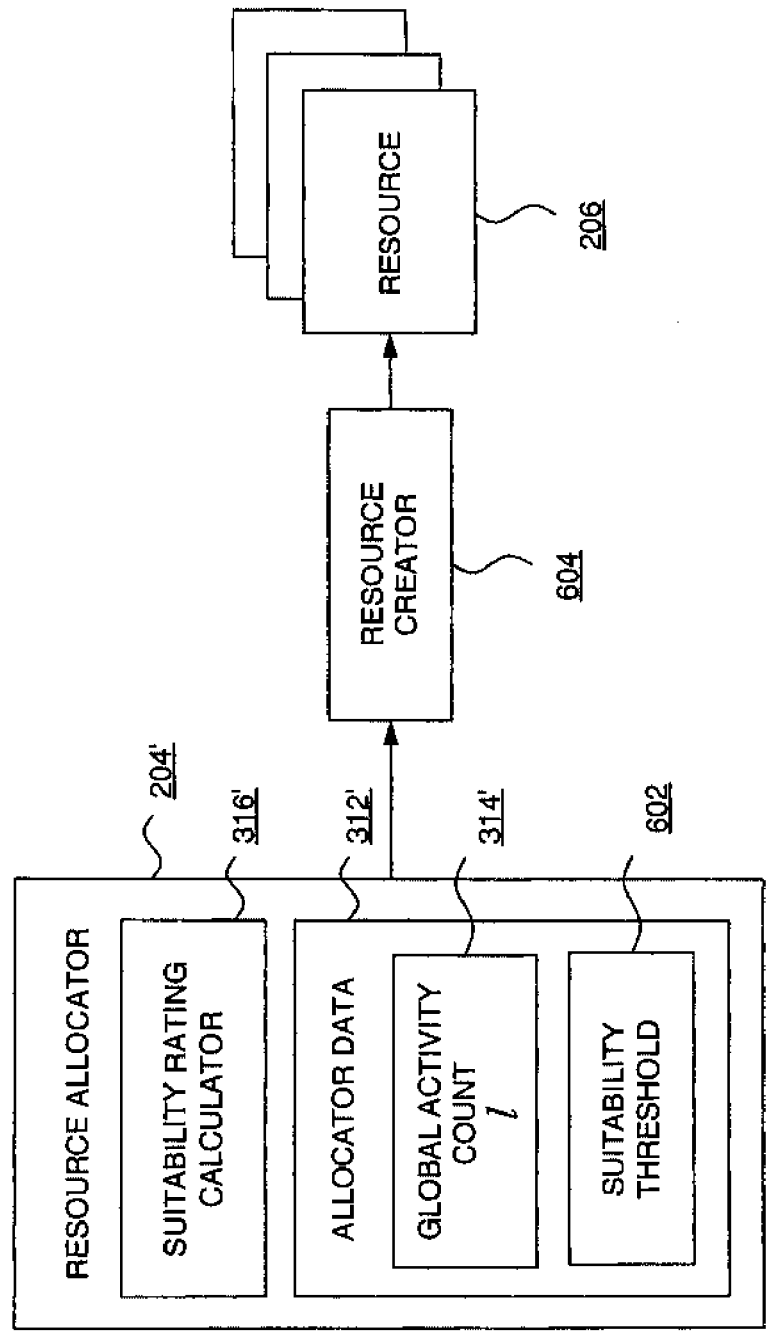
FIG. 6 is a schematic illustration of a resource allocator in accordance with an alternative embodiment of the present invention.

FIG. 6 is a schematic illustration of a resource allocator 204' in accordance with an alternative embodiment of the present invention. The resource allocator 204' of FIG. 6 is identical to that described above with respect to FIGS. 2 and 3 except in the regards described below. Resource allocator 204' further includes a suitability threshold 602 stored in the allocator data 312'. The suitability threshold 602 stores a suitability value which corresponds to a limit beyond which the resource allocator 204' instigates a new resource creation method by means of the resource creator 604 to generate a new resource. In use, the resource allocator 204' calculates a suitability rating for each resource using techniques described hereinbefore. Subsequently, the resource allocator 204' compares the values of the calculated suitability ratings against the suitability threshold 602. If the limit of the suitability threshold 602 is not met, the resource allocator instigates the resource creator 604 to generate a new resource. The generation of new resources can be limited by a maximum number of resources in a system to avoid excessive numbers of resources. Whilst the suitability threshold 602 is illustrated as being stored in the allocator data 312', it will be clear to those skilled in the art that the suitability threshold 602 could be stored external to the allocator data 312', such as in a separate data store of the resource allocator 204', or external to the resource allocator 204' altogether, such as in a data store accessible to the resource allocator 204'. Furthermore, whilst the resource creator 604 is illustrated as being external to the resource allocator 204', it will be apparent to those skilled in the art that the resource creator 604 could alternatively form part of the resource allocator 204' itself. A value of the suitability threshold 602 can be defined by a user, or can be derived from an algorithm for determining an optimum threshold based on a sample of suitability values. For example, the suitability threshold 602 can take a value which no more than 10% of a sample of all suitability values exceed.

Figure 7:
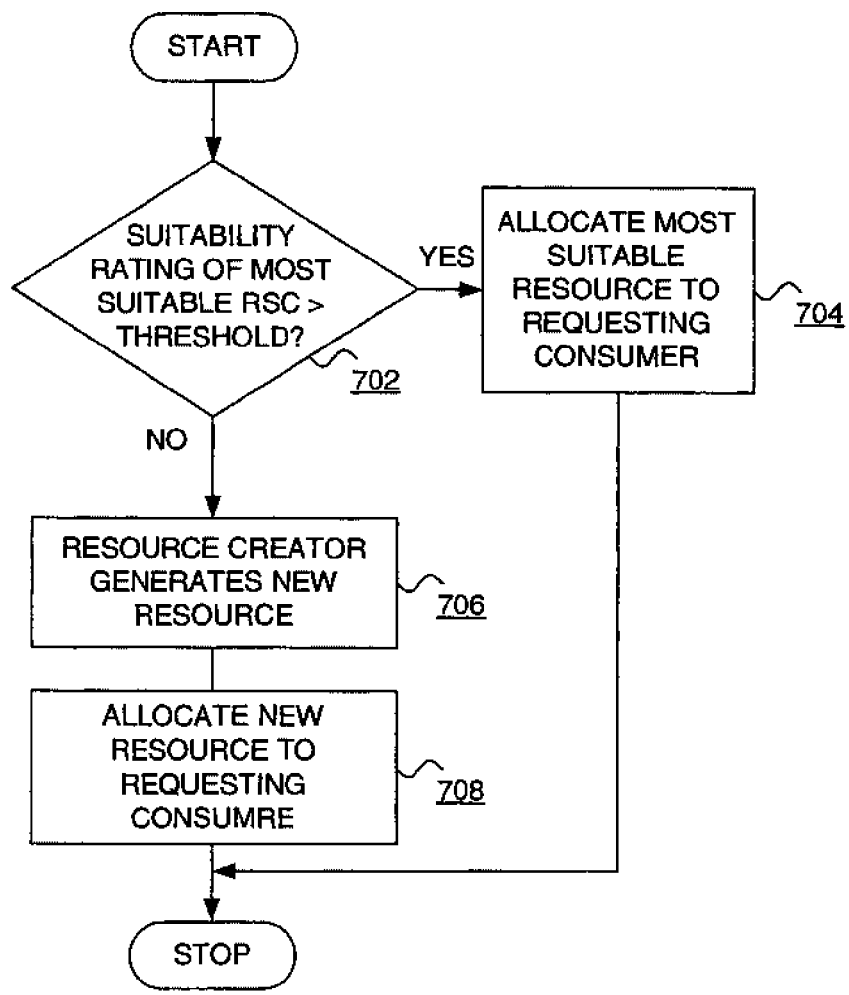
FIG. 7 is a flowchart of a method in accordance with an alternative embodiment of the present invention.

FIG. 7 is a flowchart of a method of step 416 of FIG. 4 in accordance with an alternative embodiment of the present invention. At step 702 the method determines if a suitability rating for an identified most suitable resource 206 exceeds the suitability threshold 602, and if so, the most suitable resource 206 is allocated to a requesting consumer 202 at step 704. Alternatively, at step 706 the resource creator 604 generates a new resource, and step 708 allocates the newly created resource to the requesting consumer 202. In this way, where there are no resources with a suitability for a particular requesting consumer 202 greater than the suitability threshold 602, a new resource is generated.

The invention claimed is:

1. In a computer system including a set of resources for allocation to, and access by, a plurality of consumers, a method for allocating a resource to a requesting consumer, the method comprising: calculating a suitability rating by a resource allocator executing on a central processor unit on said computer system for each of the resource in the set of resources as a value in a range from least suitable to most suitable, the suitability rating being calculated from: a) a measure of a recency of access to the resource resulting from a subtraction of a previous global activity count from a global activity count; b) a measure of a number of times the resource has been accessed by a consumer other than the requesting consumer since a previous access to the resource by the requesting consumer resulting from a subtraction of a pervious resource usage count from a resource usage count; and c) a measure of a number of times the resource is accessed by a different consumer since the previous access to the resource by the requesting consumer resulting from a subtraction of a pervious resource consumer change count from a consumer change count; identifying the resource by said resource allocator having the suitability rating which is closest to most suitable; and allocating the identified resource by said resource allocator communicatively connected by a computer network to the requesting consumer.

2. The method of claim 1 wherein the recency of access to a particular resource is measured by comparing a current total number of accesses to all the resources in the set of resources to a value of a total number of accesses to all the resources recorded at a time the particular resource was previously accessed.

3. The method of claim 2 wherein the recency of access to the particular resource is calculated by subtracting the value of the total number of accesses to all the resources recorded at the time the particular resource was previously accessed from the total number of accesses to all the resources in the set of resources.

4. The method of claim 1 further comprising, in response to a determination that the suitability rating closest to most suitable does not exceed a suitability threshold, generating a new resource and allocating the new resource to the requesting consumer.

5. The method of claim 4, wherein the generating a new resource further comprises:
   limiting the generation of the new resource to a maximum number of resources in the system.

6. In a computer system including a set of resources for allocation to, and access by, a plurality of consumers, a system for allocating a resource to a requesting consumer, the system comprising: means for calculating a suitability rating by a resource allocator executing on a central processor unit on said computer system for each of the resource in the set of resources as a value in a range from least suitable to most suitable, the suitability rating being calculated from: a) a measure of a recency of access to the resource resulting from a subtraction of a previous, global activity count from a, global activity count; b) a measure of a number of times the resource has been accessed by a consumer other than the requesting consumer since a previous access to the resource by the requesting consumer resulting from a subtraction of a pervious resource usage count from a resource usage count; and c) a measure of a number of times the resource is accessed by a different consumer since the previous access to the resource by the requesting consumer resulting from a subtraction of a pervious resource consumer change count from a consumer change count; means for identifying the resource by said resource allocator having the suitability rating which is closest to most suitable; and means for allocating the identified resource by said resource allocator communicatively connected by a computer network to the requesting consumer.

7. The system of claim 6 wherein the recency of access to the particular resource is measured by comparing a current total number of accesses to all the resources in the set of resources to a value of a total number of accesses to all the resources recorded at a time the particular resource was previously accessed.

8. The system of claim 7 wherein the recency of access to the particular resource is calculated by subtracting the value of the total number of accesses to all the resources recorded at the time the particular resource was previously accessed from the total number of accesses to all the resources in the set of resources.

9. The system of claim 6 further comprising, means for, in response to a determination that the suitability rating closest to most suitable does not exceed a suitability threshold, generating a new resource and allocating the new resource to the requesting consumer.

10. The system of claim 9, wherein the means for generating a new resource further comprises:
    means for limiting the generation of the new resource to a maximum number of resources in the system.

11. A computer program product stored on a computer readable storage medium comprising computer program code which, when executed on a data processing system by a processor, instructs the data processing system to carry out allocating a resource to a requesting consumer, comprising: calculating a suitability rating by a resource allocator executing on a central processor unit on said computer system for each of the resource in the set of resources as a value in a range from least suitable to most suitable, the suitability rating being calculated from: a) a measure of a recency of access to the resource resulting from a subtraction of a previous, global activity count from a, global activity count; b) a measure of a number of times the resource has been accessed by a consumer other than the requesting consumer since a previous access to the resource by the requesting consumer resulting from a subtraction of a pervious resource usage count from a resource usage count; and c) a measure of a number of times the resource is accessed by a different consumer since the previous access to the resource by the requesting consumer resulting from a subtraction of a pervious resource consumer change count from a consumer change count; identifying a resource by said resource allocator having the suitability rating which is closest to most suitable; and allocating the identified resource by said resource allocator communicatively connected by a computer network to the requesting consumer.

12. The computer program product of claim 11, wherein the computer program code further instructs the data processing system to carry out the method comprising:
    in response to a determination that the suitability rating closest to most suitable does not exceed a suitability threshold, generating a new resource and allocating the new resource the new resource to the requesting consumer.

13. The computer program product of claim 12, wherein the generating a new resource further comprises:
    limiting the generation of the new resource to maximum number of resources in the system.

* * * * *